US006811065B1

United States Patent
Brady

(10) Patent No.: US 6,811,065 B1
(45) Date of Patent: Nov. 2, 2004

(54) AUTO ACTIVITY CENTER WITH TOY AND BABY BOTTLE TETHER

(76) Inventor: Anita Brady, 680 Kissimmee Pl., Winter Springs, FL (US) 32708

(*) Notice: Subject to any disclaimer, the term of this patent is extended or adjusted under 35 U.S.C. 154(b) by 153 days.

(21) Appl. No.: 10/198,857

(22) Filed: Jul. 19, 2002

(51) Int. Cl.⁷ ................................................. B60R 7/00
(52) U.S. Cl. ......................... 224/311; 224/547; 224/550; 224/563; 446/228
(58) Field of Search ................................ 224/311, 313, 224/545, 547, 550, 551, 409, 275, 325, 563; 446/227, 228

(56) References Cited

U.S. PATENT DOCUMENTS

| | | | | |
|---|---|---|---|---|
| 2,327,253 A | * | 8/1943 | Eisel | ............................. 482/24 |
| 3,481,483 A | * | 12/1969 | Hill et al. | ................. 211/105.3 |
| 3,978,610 A | * | 9/1976 | Stubbmann | ................... 446/227 |
| 4,805,937 A | * | 2/1989 | Boucher et al. | ....... 280/33.992 |
| 4,946,119 A | * | 8/1990 | Hellhake | ..................... 248/102 |
| 4,989,811 A | * | 2/1991 | Millis et al. | ................. 248/104 |
| 5,121,844 A | * | 6/1992 | Ball | ............................ 211/124 |
| 5,613,657 A | | 3/1997 | Olaiz | |
| 5,702,039 A | * | 12/1997 | Olaiz | .......................... 224/409 |
| 5,928,054 A | | 7/1999 | Mast | |
| 6,000,591 A | | 12/1999 | Alexander | |
| 6,250,526 B1 | * | 6/2001 | Bess | ............................ 224/275 |
| 2002/0077020 A1 | * | 6/2002 | Graf et al. | ................... 446/227 |

* cited by examiner

Primary Examiner—Stephen K. Cronin

(57) ABSTRACT

An auto activity center with toy and baby bottle tether for providing an adjustable rod assembly adapted for use in the rear of a vehicle to suspend toys and bottles to occupy the infant during car travel. The auto activity center with toy and baby bottle tether includes a horizontal support member that is coupled to an interior of a vehicle adjacent to a top of the interior. Each of a plurality of vertical support assemblies has a first end that is coupled to the horizontal support member. Each one of the vertical support assemblies has a second end. A plurality of fastening means is coupled to the second end. Each one of the plurality of fastening means is for securing a children's accessory to the system.

20 Claims, 5 Drawing Sheets

AUTO ACTIVITY CENTER WITH TOY AND BABY BOTTLE TETHER

BACKGROUND OF THE INVENTION

1. Field of the Invention

The present invention relates to activity centers and more particularly pertains to a new auto activity center with toy and baby bottle tether for providing an adjustable rod assembly adapted for use in the rear of a vehicle to suspend toys and bottles to occupy the infant during car travel.

2. Description of the Prior Art

The use of activity centers is known in the prior art. U.S. Pat. No. 5,928,054 describes a play center device for babies comprised of a resilient foam arch for suspending various play objects. Another type of activity center is U.S. Pat. No. 5,613,657 describing a baby bottle retaining device comprised of a fastening ring, strap and means that attaches to a bed, stroller or high chair. U.S. Pat. No. 6,000,951 describes a carrier device comprised of a number of loops for attaching to various toys.

While these devices fulfill their respective, particular objectives and requirements, the need remains for an automotive activity system that would occupy an infant during long trips.

SUMMARY OF THE INVENTION

The present invention meets the needs presented above by providing an adjustable rod assembly adapted for use in the rear of a vehicle to suspend toys and bottles to occupy the infant during car travel.

Another object of the present invention is to provide a new auto activity center with toy and baby bottle tether that allows a user to choose toys that are current favorites so the child never becomes bored with the same things.

Still another object of the present invention is to provide a new auto activity center with toy and baby bottle tether that eliminates driving distractions and stress for caretakers while they are commuting around town or on long trips.

To this end, the present invention generally comprises a horizontal support member that is coupled to an interior of a vehicle adjacent to a top of the interior. Each of a plurality of vertical support assemblies has a first end that is coupled to the horizontal support member. Each one of the vertical support assemblies has a second end. A plurality of fastening means is coupled to the second end. Each one of the plurality of fastening means is for securing a children's accessory to the system.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
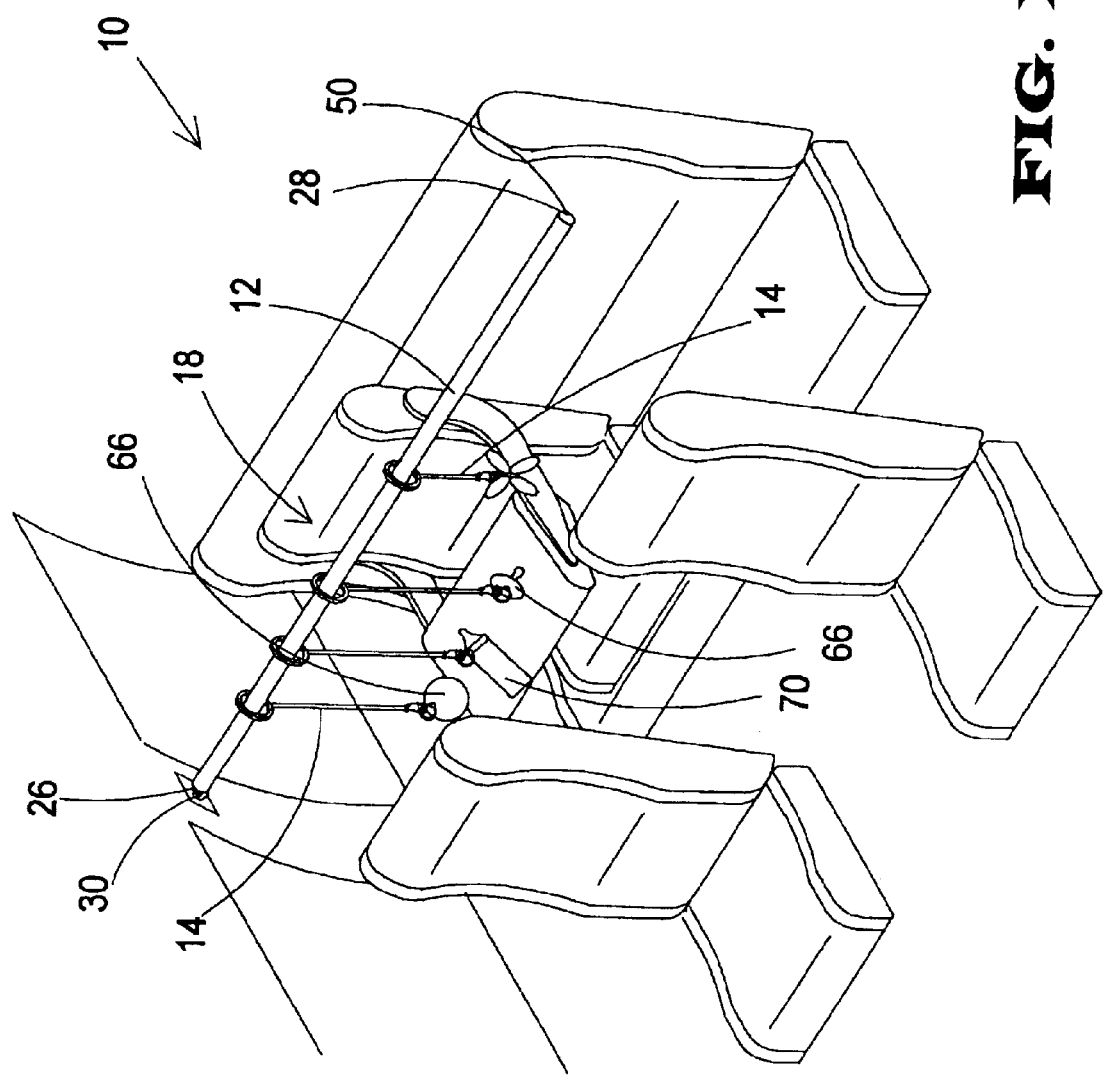
FIG. 1 is a perspective view of a new auto activity center with toy and baby bottle tether according to the present invention.
Figure 2:
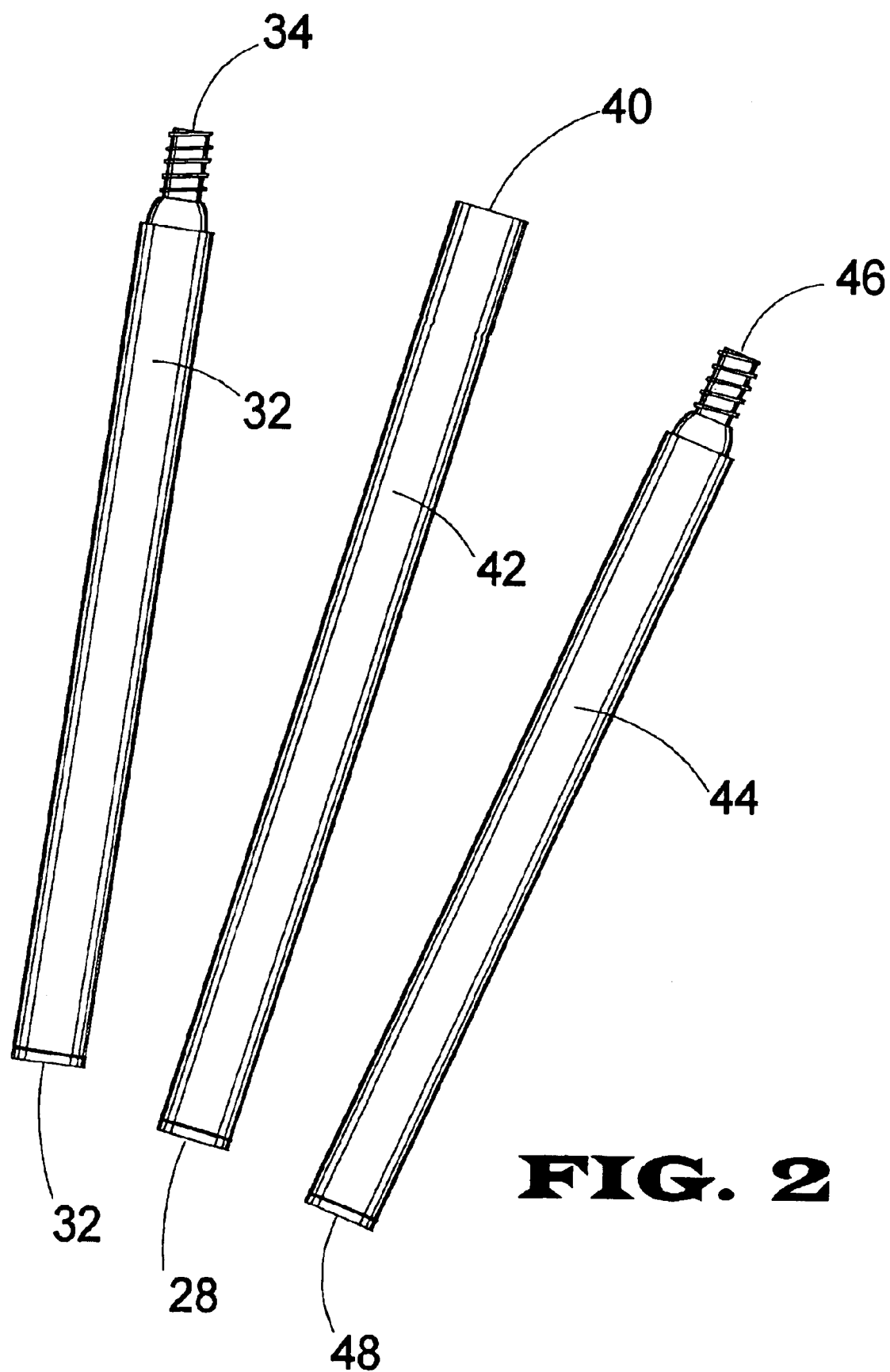
FIG. 2 is a perspective view of the present invention.
Figure 3:
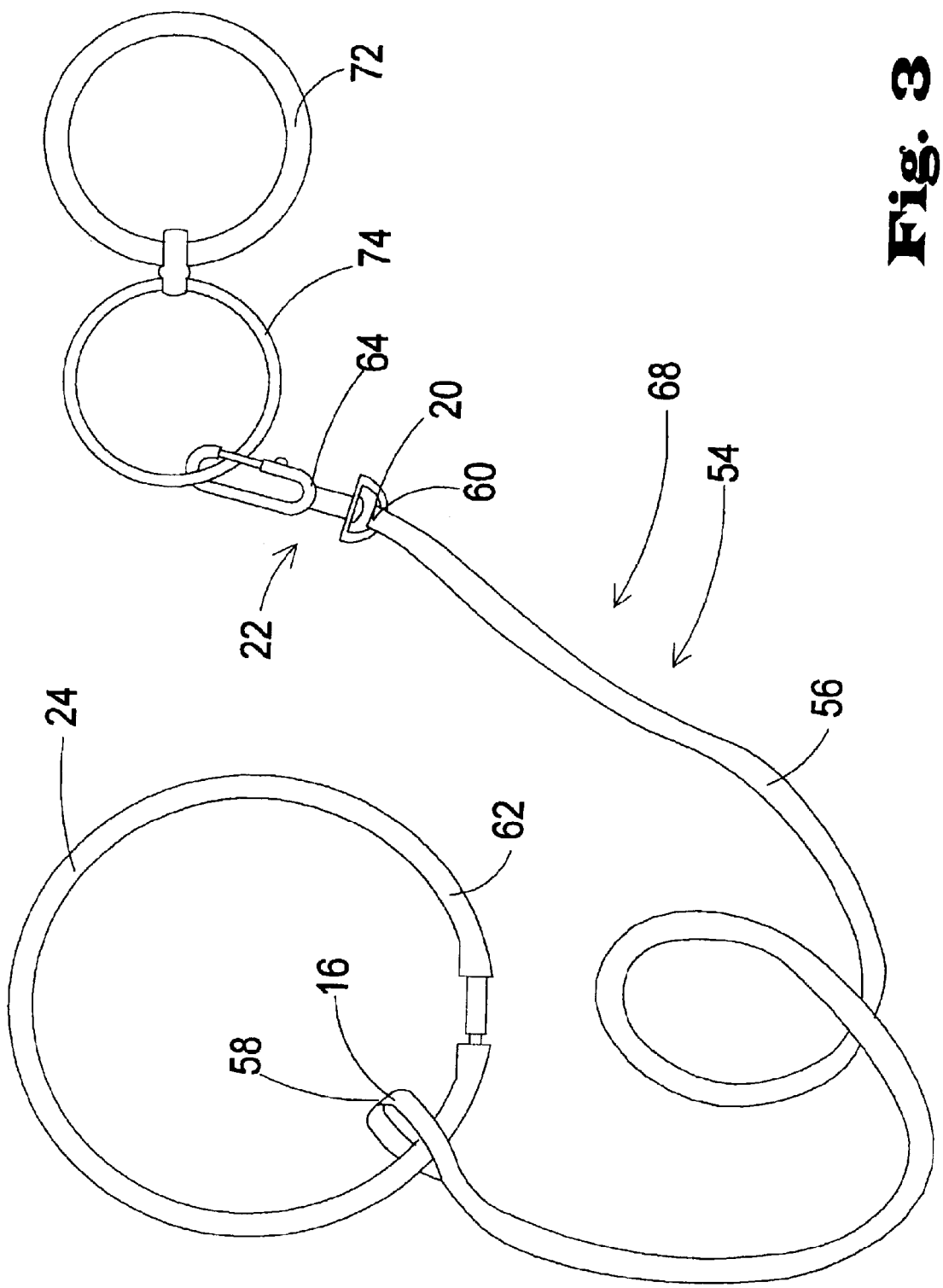
FIG. 3 is a top view of the strap assembly present invention.
Figure 4:
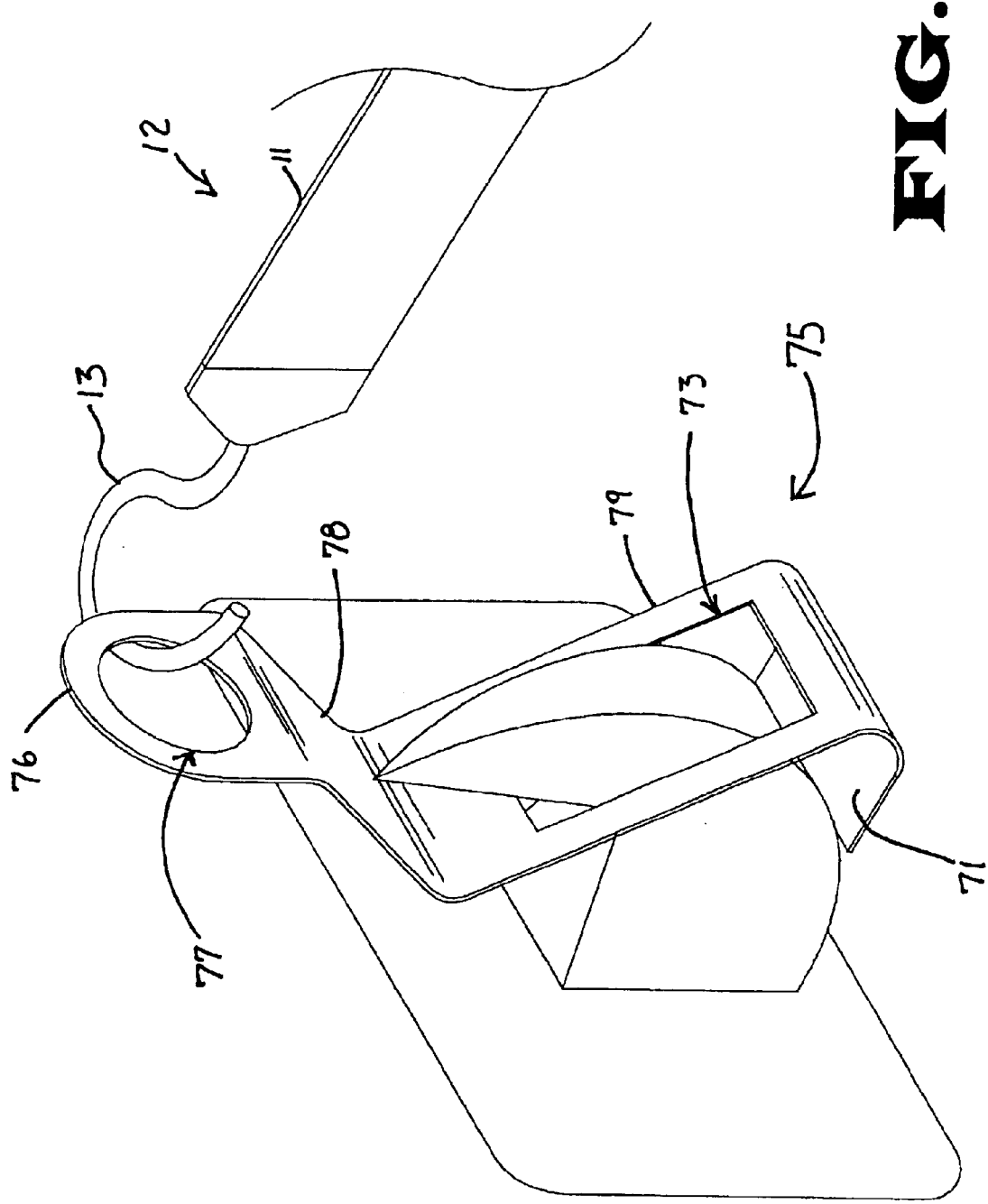
FIG. 4 is a perspective detail view of an intermediate coupling means and horizontal support member of the present invention.
Figure 5:
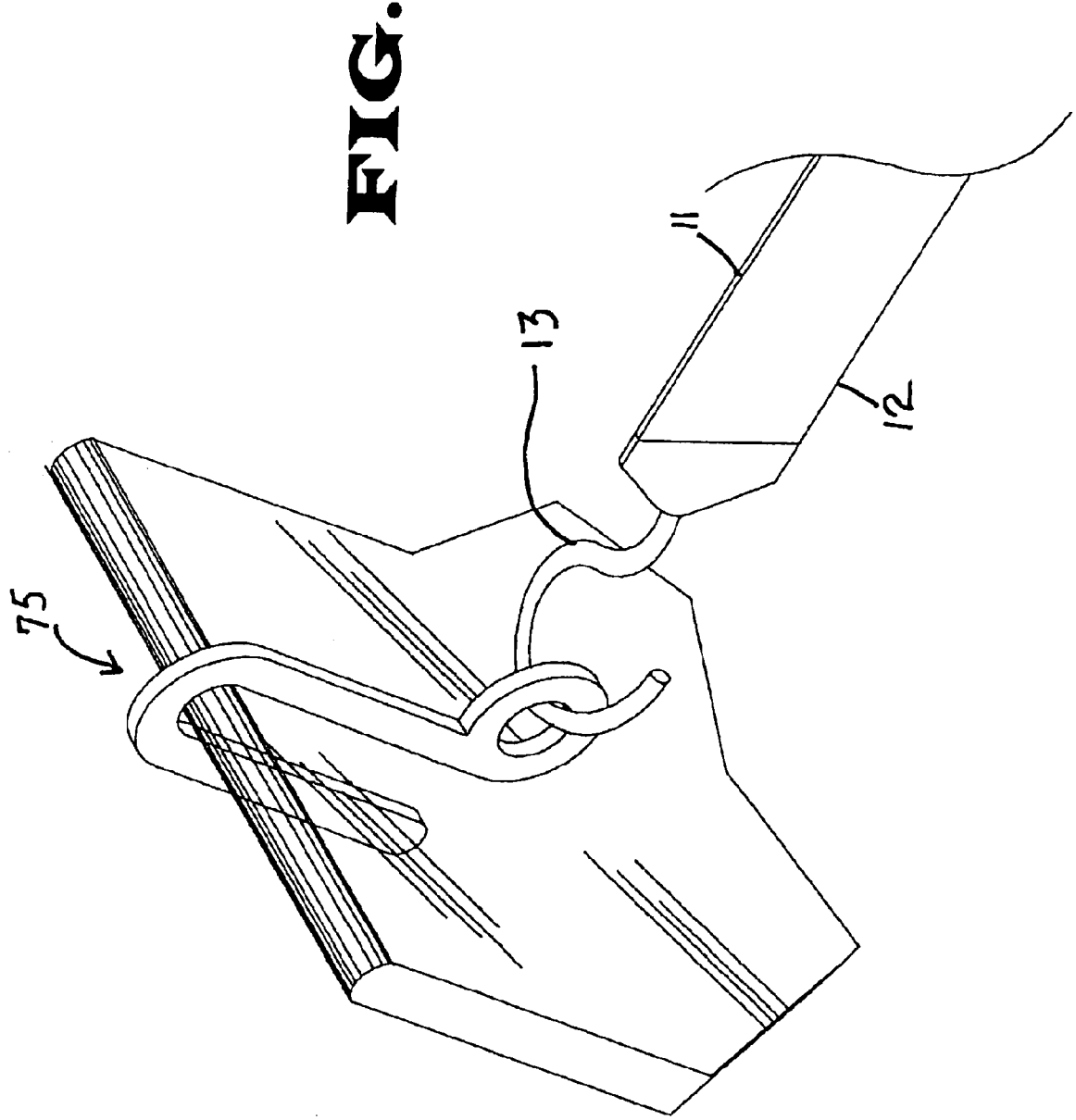
FIG. 5 is a perspective view of an embodiment of an intermediate coupling means of the present invention.

With reference now to the drawings, and in particular to FIGS. 1 through 5 thereof, a new auto activity center with toy and baby bottle tether embodying the principles and concepts of the present invention and generally designated by the reference numeral 10 will be described.

As best illustrated in FIGS. 1 through 5, the auto activity center with toy and baby bottle tether 10 generally comprises a horizontal support member 12 that is coupled to an interior of a vehicle adjacent to a top of the interior. Each of a plurality of vertical support assemblies 14 has a first end 16 that is couplable to the horizontal support member 18. Each one of the vertical support assemblies 14 has a second end 20. A plurality of fastening means 22 is coupled to the second end 20. Each one of the plurality of fastening means 22 is for securing a children's accessory to the system.

Each one of a plurality of ring members 24 is couplable to a first end 16 of an associated one of the vertical support assemblies 14. Each one of the ring members 24 is for facilitating coupling to an associated one of the vertical support assemblies 14 to the horizontal support member 12. Each one of the ring members 24 facilitates sliding an associated one of the vertical support assemblies 14 along a perimeter surface of the horizontal support member 12.

The horizontal support member 12 has a first end 26 and a second end 28. The first 26 and second 28 ends is adapted for engaging a coat hook 30 coupled to the interior of the vehicle such that the horizontal support member 12 has a spaced substantially parallel relationship with the top of the interior of the vehicle.

The horizontal support assembly 18 further includes a first horizontal portion 32 that has a first horizontal end 34 and a second horizontal end 36. The first horizontal end 34 is adapted for engaging a coat hook 30 coupled to the interior of the vehicle. A second horizontal portion 42 has a third horizontal end 38 and a fourth 40 horizontal end. The third horizontal end 38 is couplable to the second horizontal end 36. The second horizontal portion 42 has a longitudinal axis. The second horizontal portion 42 is positionable such that when the third horizontal end 38 is coupled to the second horizontal end 36 the longitudinal axis of the second horizontal portion 42 is substantially collinear with a longitudinal axis of the first horizontal portion 32.

A third horizontal portion 44 has a fifth horizontal end 46 and a sixth horizontal end 48. The fifth horizontal end 46 is couplable to the fourth horizontal end 40. The third horizontal portion 44 has a longitudinal axis. The third horizontal portion 44 is positionable such that when the fifth horizontal end 46 is coupled to the fourth horizontal end 40 the longitudinal axis of the third horizontal portion 44 is substantially collinear with a longitudinal axis of the second horizontal portion 42. The sixth horizontal end 48 is adapted for engaging a second coat hook 50 coupled to the interior of the vehicle. The second horizontal portion 42 is threadedly couplable to the first horizontal portion 32. The second horizontal portion 42 also is threadedly couplable to the third horizontal portion 44.

The plurality of fastening means 22 further includes at least one swivel clip 52 coupled to a second end 20 of an associated one of the vertical support assemblies 14. The swivel clip 52 is for facilitating securing a children's accessory to the system, such that the accessory if accessible by a small child.

The plurality of fastening means 22 further includes at least one strap assembly 54 that is operationally coupled to a second end 20 of an associated one of the vertical support assemblies 20. The strap assembly 54 is for securing a children's accessory to the system, such that the accessory if accessible by a small child. The strap assembly 54 further includes a strap member 56 that is substantially elongate. The strap member 56 has a first strap member end 58 and a second strap member end 60. A first fastener portion 62 is coupled to the first strap member end 58. A second fastener portion 64 is coupled to the second strap member end 60. The second fastener portion 64 is complementary to the first fastener portion 62. The first 62 and second 64 fastener portions is for selectively securing the strap member 56 around a children's accessory 66 whereby the children's accessory 66 is couplable to the system such that the accessory 66 is accessible by a small child.

A bottle tether assembly 68 is couplable to a baby bottle 70. The bottle tether assembly 68 is couplable to one of the plurality of vertical support assemblies 14. The bottle tether assembly 68 further includes a collar member 72 is resiliently flexible and is couplable to a baby bottle 70. The collar member 72 is adapted to be positioned around a neck of the baby bottle 70. The collar member 72 is substantially round. A connecting member 74 facilitates coupling the collar member 72 to one of the plurality of vertical support assemblies 14.

The plurality of vertical support assemblies 14 includes 6 vertical support assemblies 14. Each one of the plurality of vertical support assemblies 14 has a length in the range between 13 and 18 inches inclusive. The horizontal support member has a plurality of vertical support assemblies 14 includes 6 vertical support assemblies 14. At least one of the vertical support assemblies 14 is substantially elastic such that a length of the vertical support assembly 14 is increasable with application of a expansive force applied longitudinally. Each one of the plurality of vertical support assemblies 14 has a length in the range between 13 and 18 inches inclusive.

The horizontal support member 12 has a length in the range between 40 and 47 inches inclusive. At least one of the vertical support assemblies 14 is substantially elastic such that a length of the vertical support assembly 14 is increasable with application of a expansive force applied longitudinally.

In a preferred embodiment the horizontal support member 12 further comprises and elongate portion 11 and a pair of hook members 13. The elongate portion 11 is substantially elastic, and has a first and second end. The elongate portion 11 may be resiliently flexible and is designed to adjust a length of the system to correspond with a width of the interior of the vehicle. Each one of the pair of hook members 13 is coupled to an associated one of the first and second ends of the elongate portion 11.

In a further embodiment, an intermediate coupling means 75 is used to facilitate securing the horizontal support member 12 to the vehicle. The intermediate coupling means 75 is an interface between the horizontal support member 12 and an interior of the vehicle.

Preferably the intermediate coupling means 75 further comprises a pair of bracket members. Each one of the bracket members has a first extent 76 with an aperture 77 extending therethrough. The aperture 77 is for facilitating coupling the horizontal support member 12 to the bracket member. The bracket member also has a second extent 78 integrally coupled to the first extent 76, and designed for engaging a back side of a coat hook. Additionally, the bracket member has a third extent 79 with a bore 73 extending therethrough, for facilitating insertion of a portion of the coat hook through the bracket member such that a back side of the coat hook abuts the second extent 78. The third extent 79 may be integrally coupled to the second extent 78. The bracket member has a fourth extent 71 integrally coupled to the third extent 79, which is used for engaging a front portion of the coat hook such that a portion of a lateral force applied to the first extent 76 towards a center of the vehicle is transferred to the fourth extent 71 urging the fourth extent 71 into contact with the front portion of the coat hook.

In use, the user would secure the horizontal support member at each end to the coat hooks in the back seat of a vehicle via the intermediate support means. The user then would attach children's 30 accessories to the strap members and attach the strap members to the horizontal support member. The child would then be able to reach and play with the accessories located at the end of the strap members.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An automotive activity center system for entertaining infants and small children during transit, comprising:

a horizontal support member couplable to an interior of a vehicle adjacent to a top of the interior;

a plurality of vertical support assemblies, each one of said plurality of vertical support assemblies having a first end couplable to said horizontal support member, each one of said vertical support assemblies having a second end;

a plurality of fastening means coupled to said second end, each one of said plurality of fastening means being for securing a children's accessory to said system;

wherein said horizontal support member further comprises:

a first horizontal portion having a first horizontal end and a second horizontal end, said first horizontal end being adapted for engaging a coat hook coupled to the interior of the vehicle;

a second horizontal portion having a third horizontal end and a fourth horizontal end said third horizontal end being couplable to said second horizontal end, said second horizontal portion having a longitudinal axis, said second horizontal being positionable such that when said third horizontal end being coupled to said second horizontal end said longitudinal axis of said second horizontal portion being substantially collinear with a longitudinal axis of said first horizontal portion; and a third horizontal portion having a fifth horizontal end and a sixth horizontal end said fifth horizontal end being couplable to said fourth horizontal end, said third horizontal portion having a longitudinal axis, said third horizontal being positionable such that when said fifth horizontal end being coupled to said fourth horizontal end said longitudinal axis of said third horizontal portion being substantially collinear with a longitudinal axis of said second horizontal portion, said sixth horizontal end being adapted for engaging a second coat hook coupled to the interior of the vehicle.

2. The system of claim 1, further comprising a plurality of ring members, each one of said ring members being couplable to a first end of an associated one of said vertical support assemblies, each one of said ring members facilitating coupling an associated one of said vertical support assemblies to said horizontal support member, each one of said ring members facilitating sliding an associated one of said vertical support assemblies along a perimeter surface of said horizontal support member.

3. The system of claim 1, wherein said horizontal support member having a first end and a second end, said first and second ends being adapted for engaging a coat hook coupled to the interior of the vehicle such that said horizontal support member having a spaced substantially parallel relationship with the top of the interior of the vehicle.

4. The system of claim 1, wherein said second horizontal portion being threadedly couplable to said first horizontal portion, said second horizontal portion also being threadedly couplable to said third horizontal portion.

5. The system of claim 1, wherein said horizontal support member further comprises:
    an elongate portion being substantially elastic, said elongate portion having a first and second end, said elongate member being resiliently flexible, said elongate member facilitating adapting a length of said system to correspond with a width of the interior of the vehicle;
    a pair of hook members, each one of said pair of hook members being coupled to an associated one of said first and second ends of said elongate member.

6. The system of claim 1, wherein said plurality of fastening means further comprises at least one swivel clip coupled to a second end of an associated one of said vertical support assemblies, said swivel clip being for facilitating securing a children's accessory to said system, such that the accessory if accessible by a small child.

7. The system of claim 1, further comprising an intermediate coupling means for facilitating securing said horizontal support member to the vehicle, said intermediate coupling means being an interface between the horizontal support member and an interior of the vehicle.

8. The system of claim 7, wherein said strap assembly further comprises:
    a strap member being substantially elongate, said strap member having a first strap member end and a second strap member end;
    a first fastener portion coupled to said first strap member end; and
    a second fastener portion coupled to said second strap member end, said second fastener portion being complementary to said first fastener portion; and
    said first and second fastener portions being for selectively securing said strap member around a children's accessory whereby the children's accessory being couplable to said system such that the accessory is accessible by a small child.

9. The system of claim 1, further comprising a bottle tether assembly, said bottle tether assembly being couplable to a baby bottle, said bottle tether assembly being couplable to one of said plurality of vertical support assemblies.

10. The system of claim 9, wherein said bottle tether assembly further comprises:
    a collar member couplable to a baby bottle being resiliently flexible, said collar member being adapted for being positioned around a neck of the baby bottle, said collar member being substantially round; and
    a connecting member, said connecting member facilitating coupling said collar member to one of said plurality of vertical support assemblies.

11. The system of claim 1 wherein said plurality of fastening means further comprises at least one strap assembly operationally coupled to a second end of an associated one of said vertical support assemblies, said strap assembly being for securing a children's accessory to said system, such that the accessory if accessible by a small child.

12. The system of claim 11, wherein at least one of said vertical support assemblies being substantially elastic such that a length of said vertical support assembly is increasable with application of a expansive force applied longitudinally.

13. The system of claim 11, wherein each one of said plurality of vertical support assemblies having a length in the range between 13 and 18 inches inclusive;
    wherein said plurality of vertical support assemblies comprises 6 vertical support assemblies;
    wherein said horizontal support member having a length in the range between 40 and 47 inches inclusive; and
    wherein at least one of said vertical support assemblies being substantially elastic such that a length of said vertical support assembly is increasable with application of a expansive force applied longitudinally.

14. An automotive activity center system for entertaining infants and small children during transit, comprising:
    a horizontal support member couplable to an interior of a vehicle adjacent to a top of the interior;
    a plurality of vertical support assemblies, each one of said plurality of vertical support assemblies having a first end couplable to said horizontal support member, each one of said vertical support assemblies having a second end;
    a plurality of fastening means coupled to said second end, each one of said plurality of fastening means being for securing a children's accessory to said system;
    an intermediate coupling means for facilitating securing said horizontal support member to the vehicle, said intermediate coupling means being an interface between the horizontal support member and an interior of the vehicle; and
    wherein said intermediate coupling means further comprises a pair of bracket members, each one of said bracket members having a first extent with an aperture extending therethrough, said aperture being for facilitating coupling said horizontal support member to said bracket member, said bracket member having a second extent integrally coupled to said first extent, said second extent being adapted for engaging a back side of a coat hook, said bracket member having a third extent with a bore extending therethrough, said bore being for facilitating insertion an a portion of the coat hook through said bracket member such that a back side of the coat hook abuts said second extent, said third extent being integrally coupled to said second extent, said bracket member having a fourth extent integrally coupled to said third extent, said fourth extent being for engaging a front portion of the coat hook such that a portion of a lateral force applied to said first extent towards a center of the vehicle is transferred to said fourth extent urging said fourth extent into contact with the front portion of the coat hook.

15. The system of claim 14, further comprising a plurality of ring members, each one of said ring members being couplable to a first end of an associated one of said vertical support assemblies, each one of said ring members facilitating coupling an associated one of said vertical support assemblies to said horizontal support member, each one of said ring members facilitating sliding an associated one of said vertical support assemblies along a perimeter surface of said horizontal support member.

16. An automotive activity center system for entertaining infants and small children during transit, comprising:

a horizontal support member couplable to an interior of a vehicle adjacent to a top of the interior;

a plurality of vertical support assemblies, each one of said plurality of vertical support assemblies having a first end couplable to said horizontal support member, each one of said vertical support assemblies having a second end;

a plurality of fastening means coupled to said second end, each one of said plurality of fastening means being for securing a children's accessory to said system;

an intermediate coupling means for facilitating securing said horizontal support member to the vehicle, said intermediate coupling means being an interface between the horizontal support member and an interior of the vehicle; and wherein said intermediate coupling means further comprises a pair of bracket members, each one of said bracket member having a loop portion and a window coupling portion, said window coupling portion having a u-shaped cross section, said u section being adapted for engaging a window of the vehicle, said loop portion being coupled to said window coupling portion, said loop portion being for engaging said horizontal support member.

17. The system of claim 16, further comprising a plurality of ring members, each one of said ring members being couplable to a first end of an associated one of said vertical support assemblies, each one of said ring members facilitating coupling an associated one of said vertical support assemblies to said horizontal support member, each one of said ring members facilitating sliding an associated one of said vertical support assemblies along a perimeter surface of said horizontal support member.

18. The system of claim 17, further comprising:

wherein said horizontal support member having a first end and a second end, said first and second ends being adapted for engaging a coat hook coupled to the interior of the vehicle such that said horizontal support member having a spaced substantially parallel relationship with the top of the interior of the vehicle; and wherein said second horizontal portion being threadedly couplable to said first horizontal portion, said second horizontal portion also being threadedly couplable to said third horizontal portion.

19. The system of claim 17, wherein said horizontal support member further comprises:

an elongate portion being substantially elastic, said elongate portion having a first and second end, said elongate member being resiliently flexible, said elongate member facilitating adapting a length of said system to correspond with a width of the interior of the vehicle;

a pair of hook members, each one of said pair of hook members being coupled to an associated one of said first and second ends of said elongate member.

20. The automotive activity center system for entertaining infants and small children during transit of claim 1, further comprising:

a pair of bracket members, each one of said bracket members having a first extent with an aperture extending therethrough, said aperture being for facilitating coupling said horizontal support member to said bracket member, said bracket member having a second extent integrally coupled to said first extent, said second extent being adapted for engaging a back side of a coat hook, said bracket member having a third extent with a bore extending therethrough, said bore being for facilitating insertion an a portion of the coat hook through said bracket member such that a back side of the coat hook abuts said second extent, said third extent being integrally coupled to said second extent, said bracket member having a fourth extent integrally coupled to said third extent, said fourth extent being for engaging a front portion of the coat hook such that a portion of a lateral force applied to said first extent towards a center of the vehicle is transferred to said fourth extent urging said fourth extent into contact with the front portion of the coat hook;

wherein a plurality of ring members, each one of said ring members being couplable to a first end of an associated one of said vertical support assemblies, each one of said ring members facilitating coupling an associated one of said vertical support assemblies to said horizontal support member, each one of said ring members facilitating sliding an associated one of said vertical support assemblies along a perimeter surface of said horizontal support member;

wherein said plurality of fastening means further comprises at least one swivel clip coupled to a second end of an associated one of said vertical support assemblies, said swivel clip being for facilitating securing a children's accessory to said system, such that the accessory if accessible by a small child;

wherein said plurality of fastening means further comprises at least one strap assembly operationally coupled to a second end of an associated one of said vertical support assemblies, said strap assembly being for securing a children's accessory to said system, such that the accessory if accessible by a small child;

wherein said strap assembly further comprises:

a strap member being substantially elongate, said strap member having a first strap member end and a second strap member end;

a first fastener portion coupled to said first strap member end; and a second fastener portion coupled to said second strap member end, said second fastener portion being complementary to said first fastener portion; and said first and second fastener portions being for selectively securing said strap member around a children's accessory whereby the children's accessory being couplable to said system such that the accessory is accessible by a small child;

wherein a bottle tether assembly, said bottle tether assembly being couplable to a baby bottle, said bottle tether assembly being couplable to one of said plurality of vertical support assemblies;

wherein said bottle tether assembly further comprises:

a collar member couplable to a baby bottle being resiliently flexible, said collar member being adapted for being positioned around a neck of the baby bottle, said collar member being substantially round; and a connecting member, said connecting member facilitating coupling said collar member to one of said plurality of vertical support assemblies.

* * * * *